United States Patent [19]
Takada et al.

[11] Patent Number: 4,907,859
[45] Date of Patent: Mar. 13, 1990

[54] LIQUID CRYSTAL DEVICE AND IMAGE FORMING APPARATUS UTILIZING LIQUID CRYSTAL DEVICE

[75] Inventors: Yoshihiro Takada, Yokohama; Nagao Hosono, Hachioji, both of Japan

[73] Assignee: Canon Kabushiki Kaisha, Tokyo, Japan

[21] Appl. No.: 205,685

[22] Filed: May 25, 1988

Related U.S. Application Data

[60] Division of Ser. No. 45,769, Apr. 28, 1987, Pat. No. 4,763,992, which is a continuation of Ser. No. 670,905, Nov. 13, 1984, abandoned.

[30] Foreign Application Priority Data

Nov. 15, 1983 [JP]  Japan ................................. 58-215724

[51] Int. Cl.[4] .............................................. G02F 1/13
[52] U.S. Cl. .............................. 350/331 T; 350/350 S
[58] Field of Search ........................ 350/331 T, 350 S

[56] References Cited

U.S. PATENT DOCUMENTS

| | | | |
|---|---|---|---|
| 4,310,858 | 1/1982 | Hareng et al. | 350/350 S |
| 4,367,924 | 1/1983 | Clark et al. | 350/350 S |
| 4,413,899 | 11/1983 | Karasawa et al. | 355/4 |
| 4,527,886 | 7/1985 | Inamori et al. | 355/3 R |

Primary Examiner—Stanley D. Miller
Assistant Examiner—Anita Pellman Gross
Attorney, Agent, or Firm—Fitzpatrick, Cella, Harper & Scinto

[57] ABSTRACT

An image forming apparatus comprising: a light signal generator which comprises an exposure light source and a light-path switching means capable of interrupting the transmission of light rays at arbitrary portions of the cross-sectional area of the path of the light rays emitted from the light source, and an image-bearing member so disposed as to be illuminated with light signals from said light signal generator, wherein the light signal generator comprises: the light-path switching means which in turn comprises scanning lines, data lines and a ferroelectric liquid crystal material having an operational temperature range in which the ferroelectric liquid crystal material behaves as a ferroelectric liquid crystal and driven by selective application of signals to the scanning lines and the data lines so as to assume either one of light-transmitting state and light-interrupting state, and temperature control means for controlling the temperature of the liquid crystal material within the operational temperature range by means of at least one of heating means and cooling means.

20 Claims, 10 Drawing Sheets

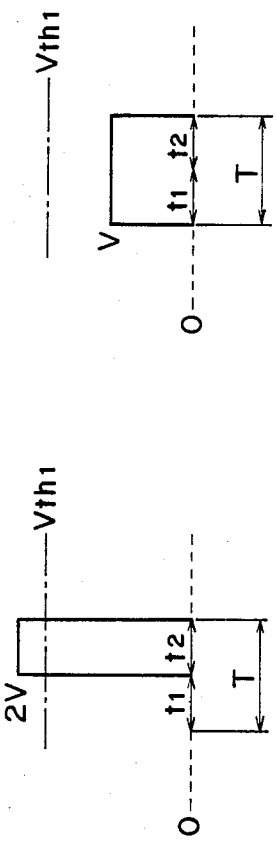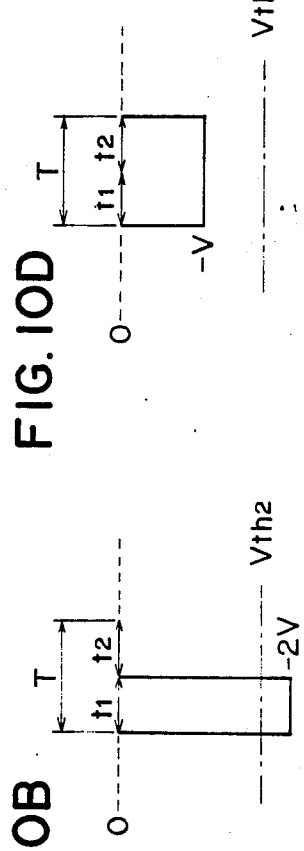
FIG.IOA  FIG.IOC
FIG.IOB  FIG.IOD

LIQUID CRYSTAL DEVICE AND IMAGE FORMING APPARATUS UTILIZING LIQUID CRYSTAL DEVICE

This is a division of application Ser. No. 045,769, filed Apr. 28, 1987, now U.S. Pat. No. 4,763,992, which is a continuation of application Ser. No. 670,905, filed Nov. 13, 1984, now abandoned.

BACKGROUND OF THE INVENTION

The present invention relates to a liquid crystal device and an image forming apparatus utilizing a liquid crystal device and more particularly to an image forming apparatus with a printer head of the type in which a light path is opened or closed by means of an optical modulator utilizing a ferroelectric liquid crystal so as to produce light signals.

With recent remarkable advances in information processing technologies, there have been increasing demands for high information or packaging density and high speed of image forming apparatus. Furthermore, there has been a strong demand for high printing quality. To satisfy these and other demands, electrophotographic devices, laser beam printers and optical fiber tube printers have been developed and put into commercial practice. However, these image forming apparatus are very expensive and complicated in construction and it is difficult to make them compact in size and light in weight. Therefore, recently there have been proposed less expensive and smaller image forming apparatus utilizing PLZT or optical shutters of liquid crystal or image forming apparatus such as LED printers utilizing light-emitting diodes. Of these image forming apparatus, liquid crystal shutter printers utilizing electrooptical effects of liquid crystal are considered promising as image forming apparatus capable of obtaining images with less expense and high information density.

As for a liquid crystal used in a head of a liquid crystal shutter printer, a method for driving a twisted nematic crystal by a two frequency system is disclosed in, for instance, Japanese Laid-Open Patent Application No. 94377/1981. According to a printer head of this system, a liquid crystal composition which exhibits a positive or a negative dielectric anisotropy in response to different frequencies of applied voltage is used, and the operation principle is based on the fact that when applied frequencies are selectively varied, the liquid crystal is optically distinguished between the state in which liquid crystal molecules are oriented in the direction of electric field and the state in which liquid crystal molecules are oriented in the direction perpendicular to the electric field. In general, the higher the applied voltage is, the faster the response speed becomes. Accordingly, as liquid crystals oriented in one direction produce a bright state while those oriented in the other direction produce a dark state, switching between the bright and the dark state can be effected by the forced application of a voltage so that high-speed response becomes possible if as high a voltage as possible is forcibly applied. However, the response time is of the order of one microsecond at the shortest and is considerably longer than the response time of the order of tens of nanoseconds of LED printer heads so that the head of a liquid crystal shutter printer has not been employed as a printer head requiring a high response speed. As for an LED printer head, it is difficult to form an LED array with uniform luminance. Therefore, when an electrostatic latent image formed by receiving this light-emitting luminance is developed with a developer comprising a toner having a charge of opposite polarity to that of the electrostatic image, there arises a defect that the optical density becomes nonuniform from dot to dot.

Meanwhile, ferroelectric liquid crystals with spontaneous polarization have been discovered and it is well known that they have considerably fast response as compared with the conventional liquid crystals because electric dipoles of liquid crystal molecules can respond in about one microsecond to the external electric field. When such a ferroelectric liquid crystal is used to form a cell of a thickness of one to two microns and used as an optical shutter, the brightness-to-darkness contrast of 1:20 can be obtained. Accordingly, research and development of high speed liquid crystal shutter printers has been carried out so as to replace the printer heads utilizing the conventional liquid crystal modes.

It is known however that when these ferroelectric liquid crystals operate as liquid crystal shutters, they are in a chiral smectic C phase (SmC*) or in a chiral smectic H phase (SmH*) which appears at relatively high temperatures (for instance, about 60°–90° C.) as compared with room temperature. Accordingly, there arises a problem that it is difficult to apply these ferroelectric liquid crystals to an image forming apparatus in which light signals are produced by a printer head utilizing such a ferroelectric liquid crystal and illuminated over a photosensitive drum of, for instance, an electrophotographic copying machine. More particularly, for the sake of the normal operation of an image forming apparatus, the liquid crystal in an optical modulator of a printer head must be always maintained at a temperature between 60°–90° C. so that the liquid crystal is kept in the SmC* or SmH* phase, whereby additional power is consumed. Moreover, there arises a problem that when the liquid crystal in the SmC* or SmH* phase is heated in excess of the above-described temperature range, smectic A phase (SmA) appears so that high speed response cannot be obtained.

SUMMARY OF THE INVENTION

In view of the above, an object of the present invention is to provide a liquid crystal device and an image forming apparatus utilizing the liquid crystal device which can substantially overcome the above and other problems of the prior art.

Another object of the present invention is to provide an image forming apparatus capable of forming an image at high speed.

The above and other objects of the present invention can be attained by a liquid crystal device of the type comprising: a light signal generator which comprises an exposure light source and a light-path switching means capable of interrupting the transmission of light rays at arbitrary portions of the cross-sectional area of the path of the light rays emitted from the light source, and an image-bearing member so disposed as to be illuminated with light signals from the light signal generator, wherein the light signal generator comprises: the light-path switching means which in turn comprises scanning lines, data lines and a ferroelectric liquid crystal material having an operational temperature range in which the ferroelectric liquid crystal material behaves as a ferroelectric liquid crystal and is driven by selective application of signals to the scanning lines and the data lines so as to assume either one of light-transmitting state and light-interrupting state, and temperature control means for controlling the temperature of the liquid crystal material within the operational temperature range by means of at least one of heating means and cooling means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A–10D show waveforms applied to SmC* or SmH*; and

DESCRIPTION OF THE PREFERRED EMBODIMENTS

In the present invention, ferroelectric liquid crystals which are in a chiral smectic C phase (SmC*) or in a chiral smectic H phase (SmH*), may preferably be used. Such crystal liquids have bistability of giving a first optically stable state and a second optically stable state. Therefore, unlike an optical modulation device utilizing the above-mentioned TN type liquid crystal, liquid crystals are oriented in the first optically stable state in response to a first or one electric field vector and in the second optically stable state in response to a second or the other electric field vector.

These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals"; "Solid State Physics" 16 (141), 1981 "Liquid Crystal", etc. Ferroelectric liquid crystals disclosed in these publications may be used in the present invention.

Examples of ferroelectric liquid crystal compounds are as follows:

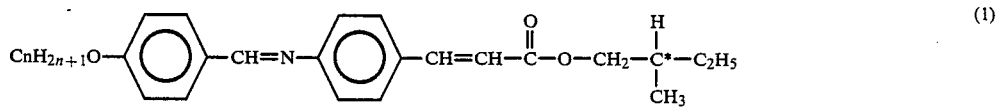

(1)

n = 6: $T_1 \approx 75°$ C., $T_2 \approx 85°$ C.
n = 7: $T_1 \approx 68°$ C., $T_2 \approx 90°$ C.
n = 8: $T_1 \approx 65°$ C., $T_2 \approx 90°$ C.
n = 9: $T_1 \approx 65°$ C., $T_2 \approx 90°$ C.
n = 10: $T_1 \approx 60°$ C., $T_2 \approx 90°$ C.

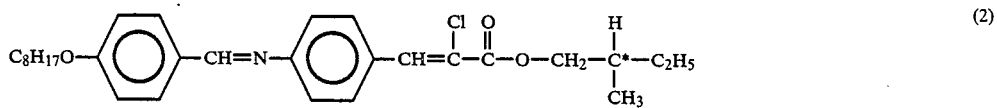

(2)

$T_1 \approx 25°$ C., $T_2 \approx 35°$ C.

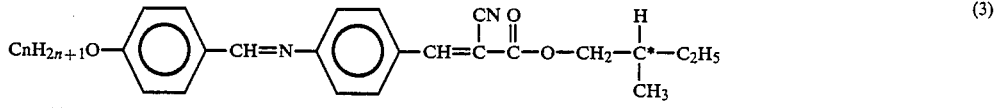

(3)

n = 10, $T_1 \approx 70°$ C., $T_2 \approx 75°$ C.
n = 14, $T_1 \approx 45°$ C., $T_2 \approx 70°$ C.

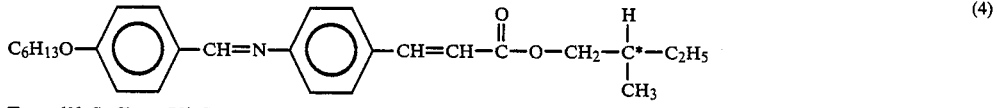

(4)

$T_1 \approx 60°$ C., $T_2 \approx 75°$ C.

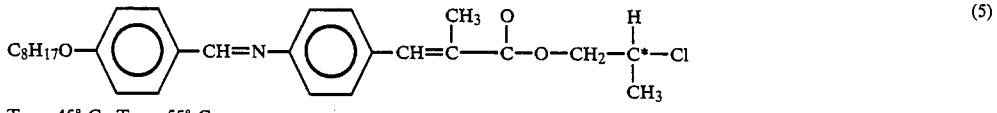

(5)

$T_1 \approx 45°$ C., $T_2 \approx 55°$ C.

-continued

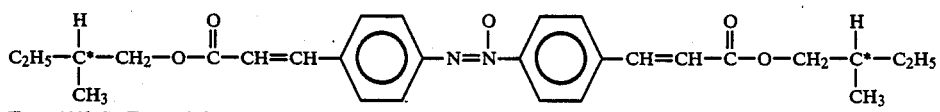

$T_1 \approx 120°$ C., $T_2 = 130°$ C.

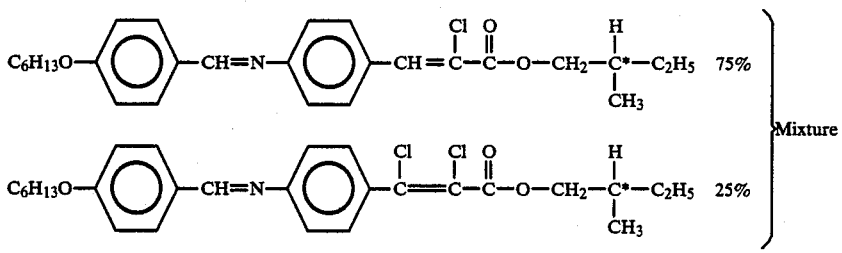

$T_1 \approx 25°$ C., $T_2 \approx 65°$ C.

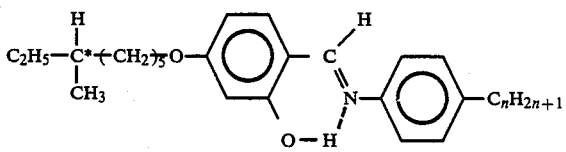

n = 4; $T_1 \approx 85°$ C., $T_2 \approx 110°$ C.
n = 8; $T_1 \approx 5°$ C., $T_2 \approx 140°$ C.
n = 12; $T_1 \approx 55°$ C., $T_2 \approx 145°$ C.

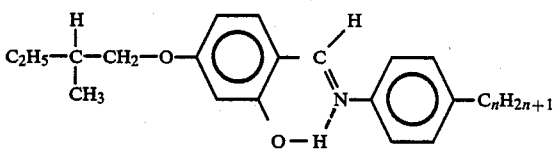

n = 8; $T_1 \approx 45°$ C., $T_2 \approx 110°$ C.
n = 10; $T_1 \approx 75°$ C., $T_2 \approx 110°$ C.

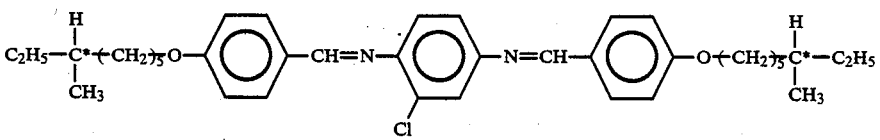

$T_1 \approx 35°$ C., $T_2 \approx 90°$ C.

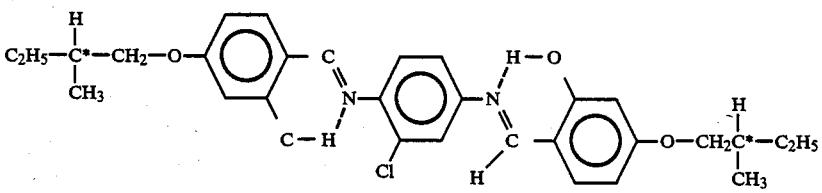

$T_1 \approx 140°$ C., $T_2 \approx 155°$ C.

In the above description including the formulae, C* represents an asymmetric carbon atom; $T_1$ represents the lowest temperature of SmC*; and $T_2$ represents the highest temperature of SmC*.

When these compounds are subjected to temperature change, the following phase change occurs:

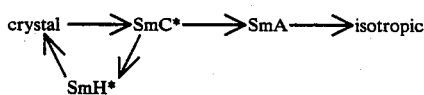

The present invention will be described in detail with reference to the accompanying drawings.

Figure 1:
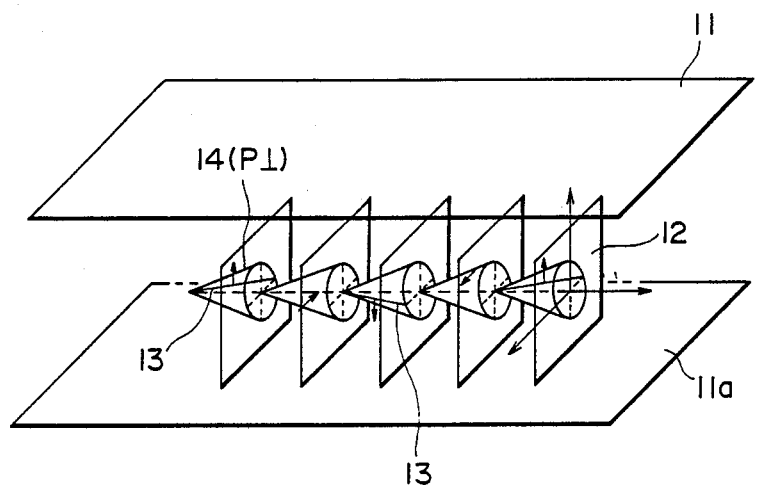
FIGS. 1 and 2 are perspective views illustrating an optical modulation element and its operation principle, respectively, used in the present invention.

FIG. 1 schematically shows a ferroelectric liquid crystal cell and is used to explain the mode of operation of a ferroelectric liquid crystal. Reference numerals 11 and 11a denote base plates (glass plates) on each of which is disposed a transparent electrode of, e.g. In₂O₃, SnO₂, ITO (Indium-Tin Oxide), etc. A liquid crystal in an SmC* or SmH* phase in which liquid crystal molecular layers 12 are oriented perpendicular to surfaces of the glass plates is hermetically disposed therebetween. A full line 13 shows liquid crystal molecules. Each crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal 13 is loosened or unwound to change the alignment direction of respective liquid crystal molecules 13 so that the dipole moments (P⊥) are all directed in the direction of the electric field. The liquid crystal molecules 13 have an elongated shape and show refractative anisotropy between the long axis and the short axis thereof. Accordingly, it is easily understood that when, for instance, polarizers arranged in a cross nicol relationship i.e. with their polarizing directions being crossing each other are disposed on the upper and the lower surfaces of the glass plates, the liquid crystal cell thus arranged functions as a liquid crystal modulation device of which optical characteristics vary depending upon the polarity of an applied voltage.

Figure 2:
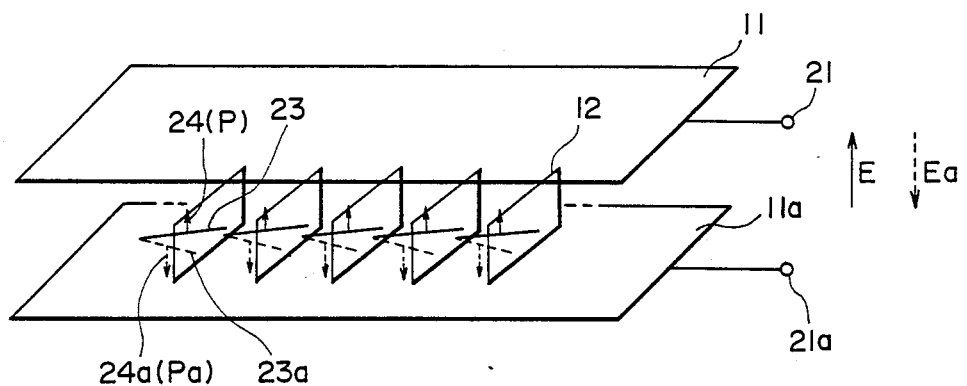

The optical modulation element or device preferably used in the liquid crystal device and the image forming apparatus utilizing such liquid crystal device may have a sufficiently thin (for instance, one micrometer) thickness. That is, as shown in FIG. 2, the spiral structure of liquid crystal molecules is loosened or unwound to result in a non-spiral structure even when an electric field is applied so that the bipolar moment P or Pa is directed upwards (24) or downwards (24a). When an electric field E or Ea which is higher than a certain threshold value and is different in polarity is applied by voltage application means 21 and 21a, the bipolar moment responds to the vector of the electric field E or Ea and are re-oriented upwards (24) or downwards (24a). Therefore, the liquid crystal molecules are oriented in a first stable state 23 or a second stable state 23a.

Two advantages can be obtained when such a ferroelectric liquid crystal is used as an optical modulation element. First is that response becomes very fast and second is that the orientation of liquid crystal molecules exhibits bistability. The second advantage will be further explained in detail with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented in the second stable state 23a, whereby the directions of the molecules are changed. Likewise, the latter state is kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible.

An image forming apparatus in accordance with the present invention utilizes ferroelectric liquid crystals of the type described above. One preferred embodiment thereof will be described in detail with reference to FIG. 3 and so on.

Figure 3:
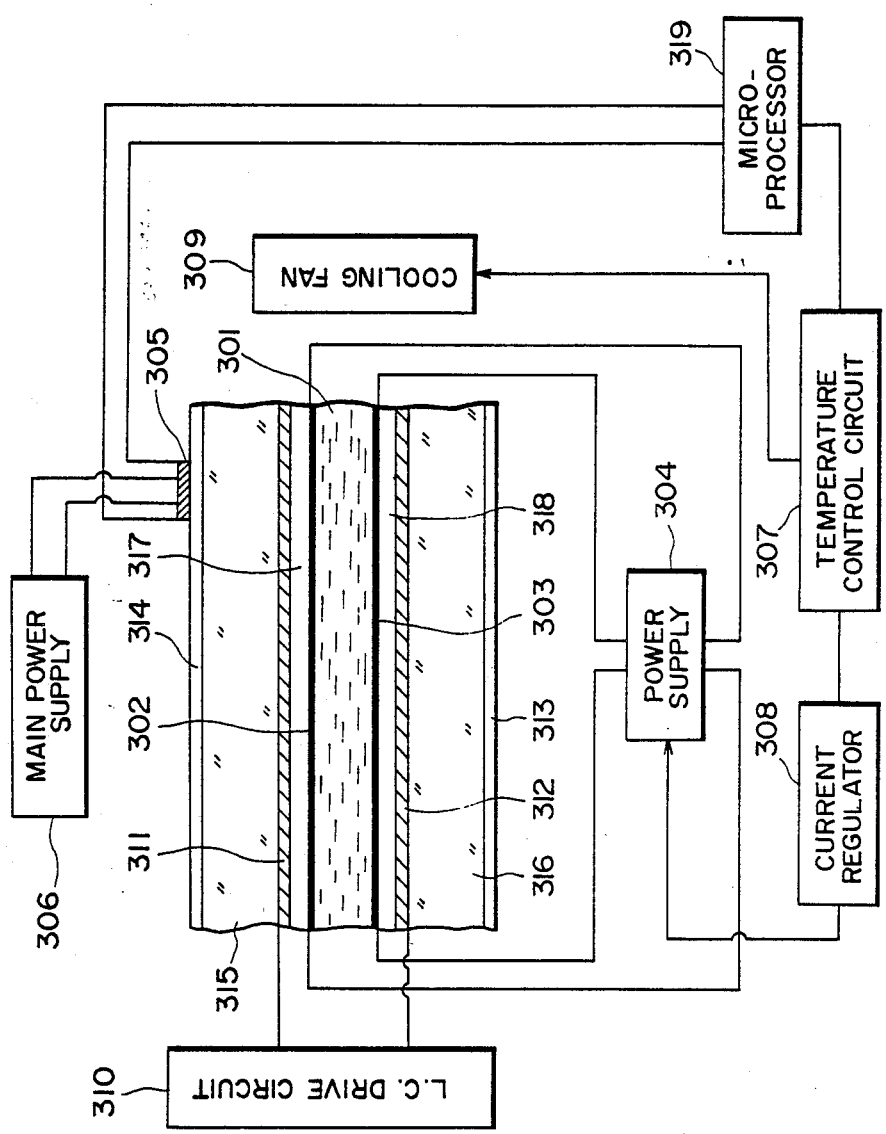
FIG. 3 is a view illustrating schematically a light-path opening and closing means used in the present invention.

FIG. 3 shows light-path switching means or light-path opening and closing means in the form of a liquid crystal cell and temperature control means of a light signal generator incorporated in an image forming apparatus in accordance with the present invention. The light-path switching means is provided with temperature control means for controlling the temperature of a ferroelectric liquid crystal within a temperature range wherein the ferroelectric liquid crystal can remain in the SmC* or SmH* phase.

The light-path switching means shown in FIG. 3 is provided with temperature raising means so that when it is used as a printer head of an image forming apparatus, an electrooptic modulation material 301 in the cell can remain in the SmC* or SmH* phase. Temperature raising means are in contact with the electrooptic modulation material 301 in the SmC* or SmH* phase. Alternatively, temperature raising means comprise heat-generating resistor members 302 and 303 upon which are formed insulating layers or films (not shown) and a power supply 304. The heat generating resistor members 302 and 303 may be formed in the form of a film of a transparent metal oxide compound such as indium oxide, zinc oxide, titanium oxide or the like.

Figure 4:
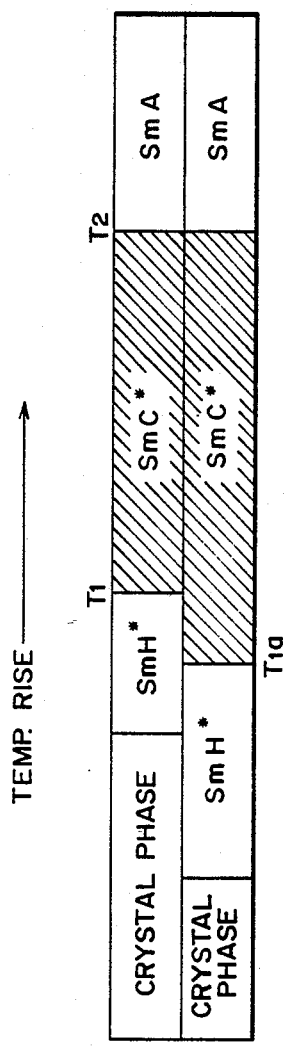
FIG. 4 is a view used to explain the change in liquid crystal phase in response to temperature rise and drop.
Figure 5:
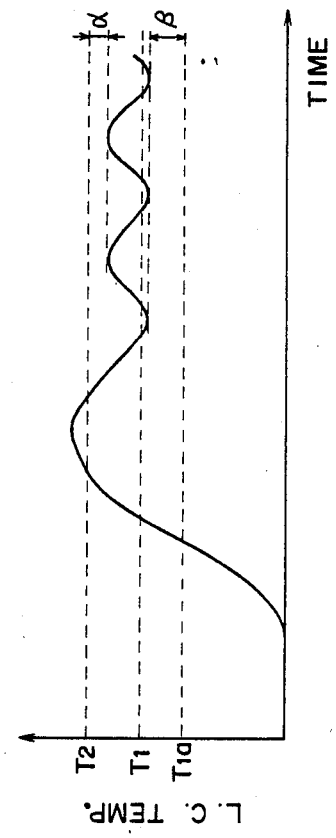
FIG. 5 is a view used to explain the temperature dependency of an optical modulation element used in the present invention.

As shown in FIG. 4, many of ferroelectric liquid crystals exhibit different phase boundaries when they are raised or lowered in temperature. More particularly, the stable temperature range in which a ferroelectric liquid crystal remains in the SmC* phase upon heating is different from that upon cooling. In general, the ferroelectric liquid crystal stably remains in the state SmC* down to a lower temperature ($T_{1a}$) when i is subjected to temperature decrease, as compared with a case where the liquid crystal is subjected to temperature increase and changes from SmH* phase to the SmC* phase at a temperature $T_1$ which is higher than $T_{1a}$. There exists no problem when the lowermost temperatures $T_1$ and $T_{1a}$ are substantially equal to each other. When $T_1$ is higher than $T_{1a}$, however, as the power consumption is less when the temperature of liquid crystal is maintained at $T_{1a}$ rather than $T_1$, it is preferable that in this embodiment, as shown in FIG. 5, the temperature of liquid crystal is once raised above the temperature $T_2$ and then gradually lowered and finally maintained at the SmC* phase temperature range T which is given by $$T_{1a}+\beta<T<T_2-\alpha$$

where $\alpha$ and $\beta$ are constants and $$T_{1a}<T_{1a}+\beta<T_1<T_2-\alpha<T_2.$$

Figure 6:
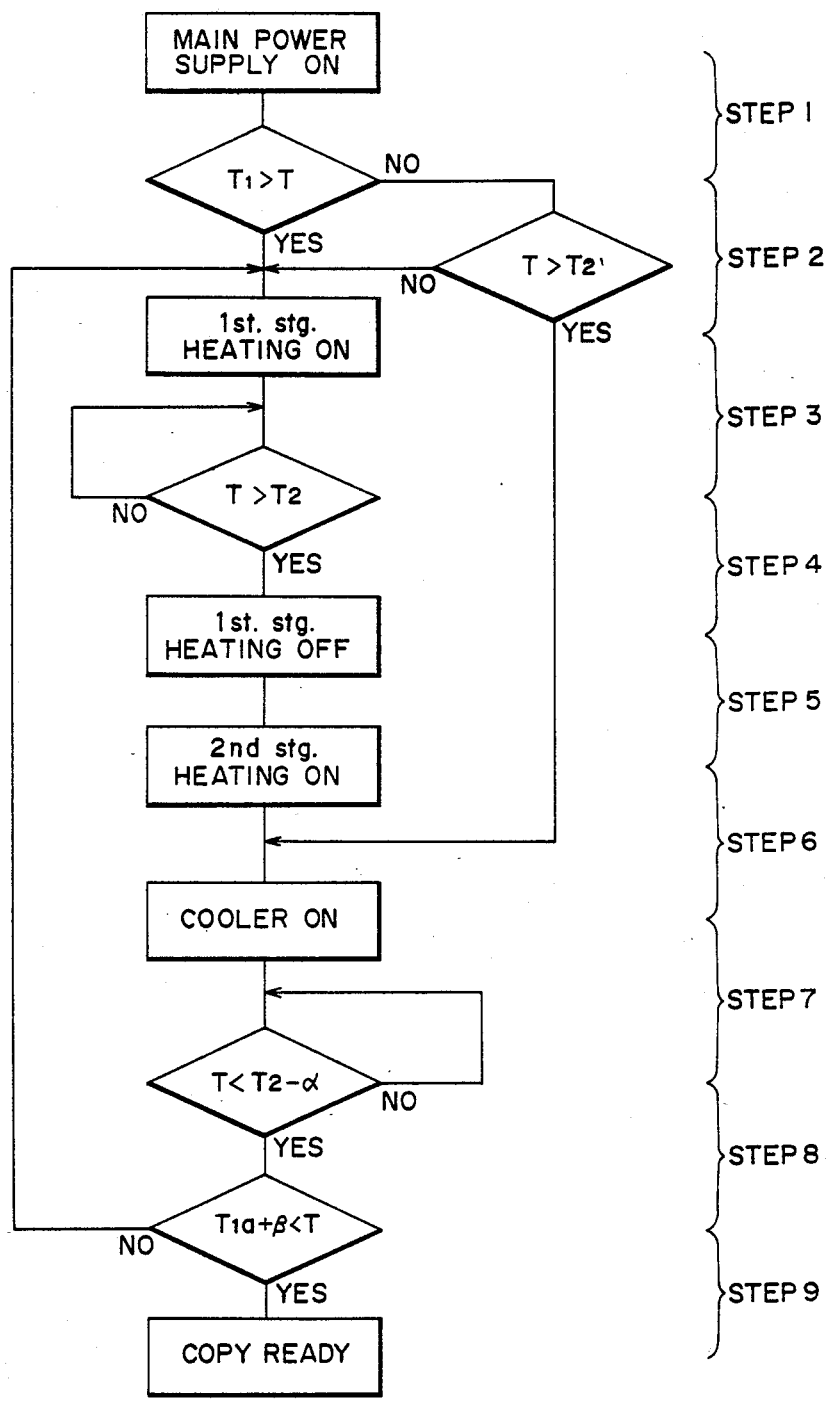
FIG. 6 shows a temperature control flowchart for controlling the light-path switching means.

Therefore, according to the present invention, a large current is first caused to pass through the heat-generating resistor members 302 and 303 so that the temperature rises fast (first stage heating) and after the temperature of liquid crystal exceeds $T_2$, the current passing through the heat-generating resistor members 302 and 303 is reduced (second stage heating) simultaneously with the actuation of a cooler so that the temperature of liquid crystal is lowered down to and maintained at T. Such temperature control can be attained by actuating or energizing the heat generating resistor members 302 and 303 stepwise in response to the output signal of a temperature sensor 305. Such temperature control sequence is shown in a flow chart of FIG. 6. FIG. 6 shows a two-stage heating scheme comprising first and second stages. The conditions imposed upon the heating in each stage and the cooling are as follows:
First stage heating capacity > Cooling capacity, and
Second stage heating capacity < Cooling capacity.

The temperature control sequence as shown in FIG. 6 can be carried out in the electric circuit as shown in FIG. 3. In Step 1, a main power supply 306 is turned on and the temperature of the electrooptic modulation material 301 in the cell is detected by the temperature sensor 305. In Step 2, when the temperature T of the modulation material 301 is lower than $T_1$; that is, when $T_1 > T$ is YES, the power supply 304 is turned on so that the first stage heating is carried out. When the temperature T of the modulation material T is higher than $T_1$;

that is, when $T_1 > T$ is NO, it is further detected whether or not $T > T_2$. When $T > T_2$ (YES), Step 6 is executed, but when $T < T_2$ (NO), the first stage heating is continued.

In Step 3, the first stage heating is effected and in response to the output signal from a microprocessor 319, a temperature control circuit 307 and a current regulator 308 are actuated to control the current passing through the heat generating resistor members 302 and 303 so that the modulation material 301 is heated until $T > T_2$ (YES).

In Step 4, the first stage heating is stopped. Simultaneously with termination of the first stage heating, Step 5 is executed. That is, upon completion of Step 4, in response to the control signal from the microprocessor 319, the current regulator 308 decreases current flowing through the heat-generating resistor members 302 and 303 so that generated heat is decreased.

In Step 6, a cooling fan 309 is turned on and, in Step 7, the temperature T of the modulation material 301 which is higher than $T_2$ is lowered until $T < T_2 - \alpha$ (YES). Step 7 is a step in which a temperature below the upper temperature of the temperature range in which the modulation material 301 exhibits the properties of ferroelectric liquid crystal is secured. Next step 8 is a step in which a temperature above the lower limit of the temperature range in which the modulation material 301 exhibits the properties of ferroelectric liquid crystal is secured. Thus, when $T > T_2 - \alpha$; that is, NO in step 7, cooling is continued. However, when $T_{1a} + \beta > T$, that is, when NO in Step 8, Step 2 is executed again so that Steps 2-7 are executed again.

In Step 9, the temperature T of the modulation material 301 is such that $T_{1a} + \beta < T < T_2 - \alpha$ (YES). As a result, an image forming apparatus (for instance, an electrophotographic copying machine) is brought to the state of "Copy Ready".

In accordance with the above-described temperature control sequence, the temperature of the modulation material 301 in the cell is controlled as indicated by the curve as shown in FIG. 5.

In actual operations, $\alpha$ and $\beta$ are preferably set to be 1° C. or larger, particularly 5° C. or larger and so as to satisfy the relationship:

$$0.1° C. \leq (T_2 - \alpha) - (T_1 + \beta) < 10° C.$$

In the light-path switching means shown in FIG. 3, a liquid crystal drive circuit 310 applies selectively signals to electrodes 311 and 312 disposed within the cell. As a result, the orientation of the electrooptic modulation material 301 is selectively controlled so that the light path is opened or closed. The change in orientation is detected by polarizers 313 and 314 disposed on both sides of the electrodes 311 and 312.

In FIG. 3, reference numerals 315 and 316 denote glass or plastic base plates or substrates; 317 and 318, insulating films of polyimide, polycarbonate, polyamide or the like.

Figure 7:
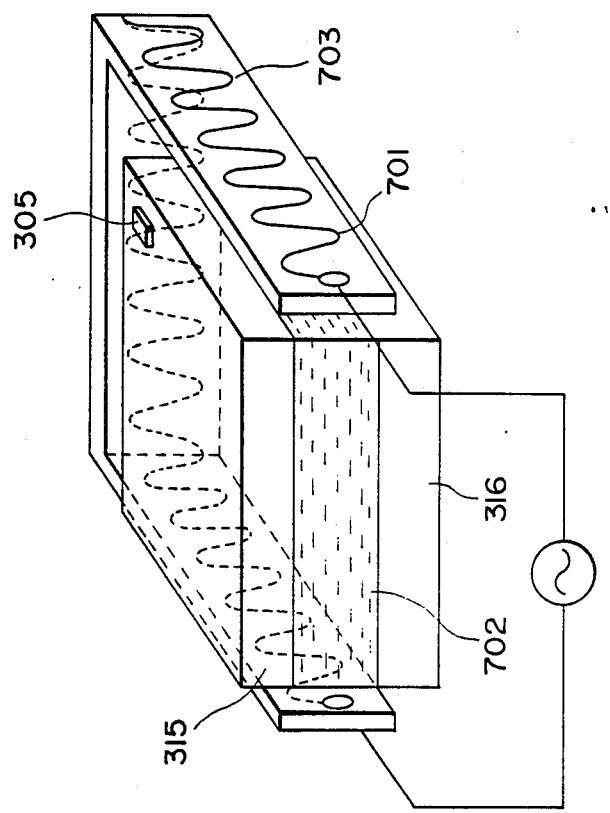
FIG. 7 is a perspective view of another light-path switching means in accordance with the present invention.

FIG. 7 shows another embodiment of the light-path switching means in accordance with the present invention. In this embodiment a heating unit 703 comprising a heat insulating body arranged with a resistance heating element 701 is attached to the whole or a part of periphery or side surfaces of a liquid crystal cell 702. The current flowing through this resistance heating element 701 can be controlled in a manner substantially similar to that described with reference to the flowchart shown in FIG. 6.

Next, referring to FIGS. 8–10, the mode of operation of light-path switching means in accordance with the present invention will be described.

Figure 8:
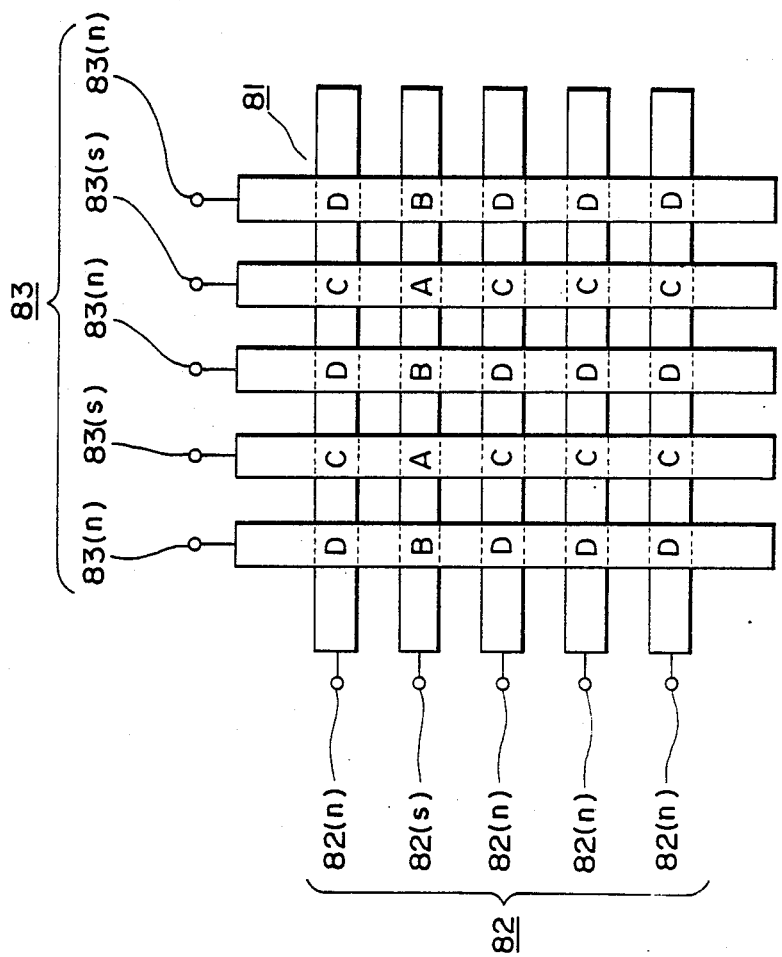
FIG. 8 is a plan view illustrating an electrode matrix arrangement used in the light-path opening and closing means of the present invention.
Figure 9A:
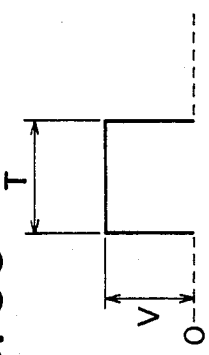
FIGS. 9A–9D show waveforms of electrical signals applied to the electrode matrix.
Figure 9C:
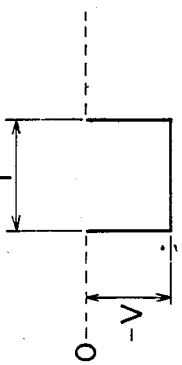
Figure 9B:
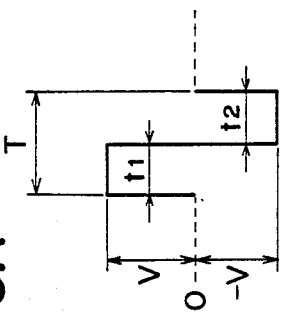
Figure 9D:
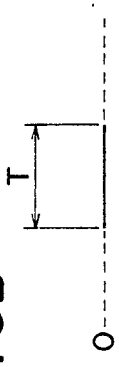

FIG. 8 shows schematically a cell 81 having a matrix electrode arrangement in which a ferroelectric liquid crystal compound is interposed between a pair of groups of electrodes oppositely spaced from each other. Reference numeral 82 denotes scanning lines (common electrode group) to which are applied scanning signals; 83, data lines (signal electrode groups) to which are applied data signals. FIGS. 9A and 9B show an electrical signal applied to a selected scanning line 82(s) and an electrical signal applied to non-selected scanning lines 82(n), respectively. FIGS. 9C and 9D show an electrical signal applied to selected data lnes 83(s) and an electrical signal applied to non-selected data lines 83(n), respectively. In FIGS. 9A–9D, time is plotted along the abscissa while a voltage, along the ordinate. For instance, when a moving picture is to be displayed, the scanning lines 82 are sequentially and periodically selected. It is now assumed that a threshold voltage for maintaining a liquid crystal cell with bistability in a first stable state is $V_{th1}$ and a threshold voltage for maintaining the liquid crystal cell in a second stable state is $V_{th2}$. Then, as shown in FIG. 9A, an electrical signal applied to the selected scanning line 82(s) is an alternative voltage which is V at time $t_1$ and is $-V$ at time $t_2$. The remaining non-selected scanning lines 82(n) are grounded as shown in FIG. 9B. That is, the electrical signal applied to them is zero. As shown in FIG. 9C, the electrical signals applied to the selected data lines 83(s) are V and the electrical signals applied to the non-selected data lines 83(n) are $-V$. In this instance, the voltage V is set to a desired value satisfying the relationships of:

$V < V_{th1} < 2V$; and $-V > -V_{th2} > -2V$

FIGS. 10 show voltage waveforms applied to respective picture elements when the above-described electrical signals are applied to the scanning and data lines in the manner described above. FIGS. 10A–10D correspond to picture elements A, B, C and D, respectively, shown in FIG. 8. That is, as is clear from FIG. 10, during a time period $t_2$, a voltage 2 V exceeding the threshold value $V_{th1}$ is applied to a picture element A. A voltage $-2$ V exceeding the threshold value $-V_{th2}$ in terms of the absolute value is applied to the picture element B arranged in the same scanning line during a time period $t_1$. Therefore, depending upon whether or not data lines intersecting a selected scanning line are selected, the orientation of liquid crystal molecules changes. Namely, when data lines intersecting a selected scanning line are selected, liquid crystal molecules are oriented in the first stable state. On the other hand, when data lines are not selected, liquid crystal molecules are oriented to the second stable state. In either case, the orientation to the first or the second stable state is not related at all to whether or not the liquid crystal in respective picture elements has been maintained in the first or the second stable state.

On the other hand, a voltage $+V$ or $-V$ not exceeding threshold values is applied to all the picture elements C and D on the non-selected scanning lines. Therefore, the liquid crystal molecules in the picture elements C and D remain in the same first or second stable state which has been obtained in the previous scanning operation. That is, when one scanning line is selected, signals for this selected scanning line are entered or written and these entered or written signals remain unchanged until the scanning line is selected again after one frame has been completely scanned. Therefore, even when the scanning lines are increased in number, a duty ratio remains substantially unchanged and the contrast is not degraded and crosstalk can be completely suppressed. The voltage V and the time period T ($=t_1+t_2$) are dependent upon a liquid crystal used and the thickness of a cell. In general, however, the voltage V is between 3 and 70 volts and the time period T is between 0.1 $\mu$sec and 2 msec. Therefore, an electrical signal applied to a selected scanning line causes the change from the first stable state ("bright" state when converted into a light signal) to the second stable state ("dark" state when converted into a light signal), or vice versa.

Figure 11:
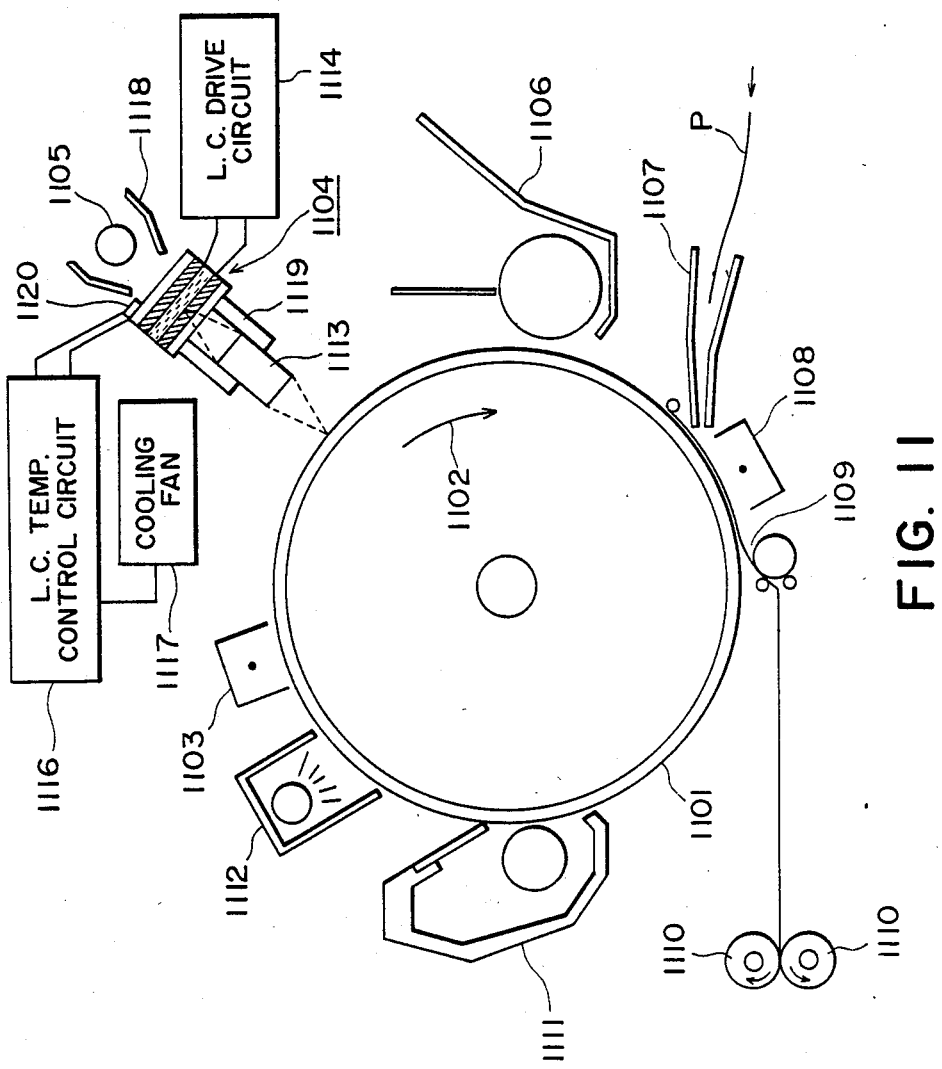
FIGS. 11 and 12 are schematic sectional views of an image forming apparatus in accordance with the present invention.

FIG. 11 shows an embodiment (electrophotographic printer) with a light-path switching means (to be referred to as "an optical shutter" hereinafter in this specification) 1104 of the type described. A photosensitive drum 1101 which is an image-bearing member is rotated in the direction indicated by an arrow 1102 so that the cylindrical surface of the photosensitive drum 1101 is uniformly charged by a charger 1103. The optical shutter 1104 is driven so that light rays emitted from a lamp 1105 disposed behind the optical shutter 1104 are selectively permitted to transmit through the optical shutter 1104. As a result, light signals are generated and illuminated over the charged cylindrical surface of the photosensitive drum 1101, whereby an electrostatic latent image is formed thereon. The electrostatic latent image is developed with a toner supplied from a developer 1106 and is transferred onto a copy sheet P passing through a transfer guide 1107. The copy sheet P onto which is transferred a toner image is gradually separated from the photosensitive drum 1101 by means of a separation belt device 1109 and the toner image is fixed by a fixing device 1110. A part of the toner still remaining upon the cylindrical surface of the photosensitive drum 1101 is removed by a cleaning device 1111 and thereafter the cylindrical surface of the photosensitive drum 1101 is discharged by means of a pre-exposure device 1112. Then, the next cycle of copying operation can be carried out.

The optical shutter 1104 shown in FIG. 11 utilizes a ferroelectric liquid crystal of the type described above. That is, the light rays emitted from the exposure light source 1105 are focused through the optical shutter 1104 and a lens array 1113 over the cylindrical surface of the photosensitive drum 1101. In this case, a liquid crystal drive circuit 1114 is energized in response to digital signals including image information obtained from an original information reader or the like (not shown) so that light signals representative of an image information pattern are exposed over the cylindrical surface of the photosensitive drum 1101 by turning on and off the ferroelectric liquid crystal optical shutter. In this embodiment, the exposure light source 1105 has the function of heating a liquid crystal cell and a liquid crystal cooling fan 1117 is driven by a liquid crystal temperature control circuit 1116 connected to a temperature sensor 1120 so as to prevent overheating of the liquid crystal cell and maintain the liquid crystal cell at a predetermined temperature. In FIG. 11, reference numeral 1118 denotes a light reflector; and 1119, a member for mounting the lens array 1113 on the liquid crystal shutter.

Figure 12:
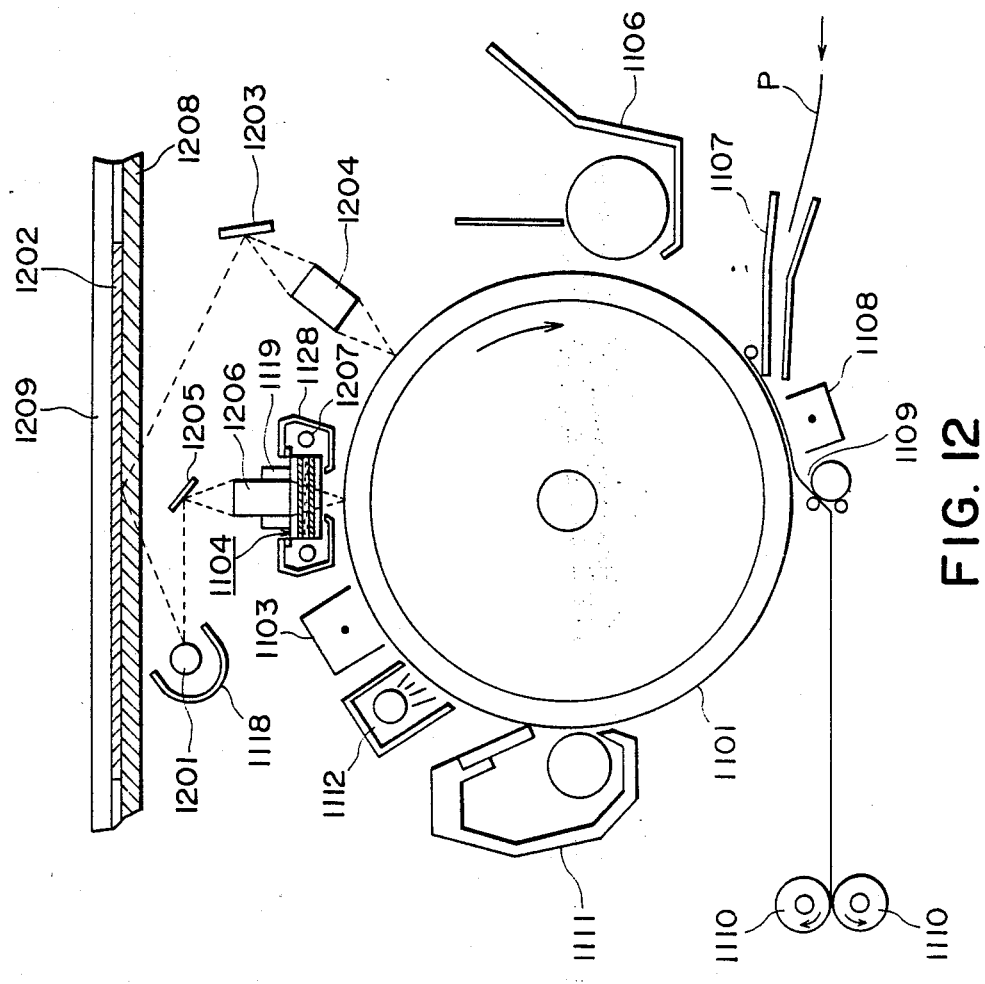

FIG. 12 shows another embodiment of an electrophotographic copying device with an optical shutter of the type described above. In a first optical path, a light beam emitted from an original illumination light source 1201 is reflected by an original 1202 and is focused upon the cylindrical surface of the photosensitive drum 1101 through a reflecting mirror 1203 and a lens array 1204. In a second optical path, a light beam is re-directed by a reflecting mirror 1205 to the optical shutter 1104 through a lens array 1206. A program is prepared in such a way that in response to the output signal derived from a device (not shown) for designating coordinates of a point on the original, it is determined that a voltage is applied to which electrode layer for what time period and at what time point. Therefore, the automatic control for switching a light path is carried out in accordance with this program.

For instance, coordinates (Xk, Yk) of a point on the original is obtained by the coordinate designating device (not shown) of the type described above. Thereafter, in response to clockpulses from a clock generator ($y_1$- $y_n$: N clockpulses), a microprocessor effects such a control that a liquid crystal cell for a pattern portion is closed while a liquid crystal cell for a non-pattern portion is opened. In response to the clock pulses, a serial data is converted into a parallel data by a shift register and after one line data has been stored into a latch, a liquid crystal driver is driven. In this way, a black frame on the copy sheet produced due to the shadow of an end portion of an original can be eliminated. Furthermore, in response to a clock pulse corresponding to $x=x_k/2$, a liquid crystal cell is opened by means of a book mode key or the like so that a black line on a copy sheet due to the shadow of a center binding of a book can be eliminated. In FIGS. 11 and 12, same reference numerals are used to designate similar parts. As described above, the black frames of originals and black lines of center bindings of books which adversely affect the appearance of copy sheets in the case of copying can be eliminated.

In the embodiment as shown in FIG. 12, in order to heat a liquid crystal cell, a light-source heater 1207 is used. The temperature control of liquid crystals can be effected by utilizing means of the types described above. In FIG. 12, reference numeral 1128 represents a light shield for preventing the leakage of light rays from the light source 1207; 1208, an original stand; and 1209, an original holding cover. The optical shutter 1104 may further be used as a display device for indicating a state that the image recording operation is ready when the temperature of liquid crystal rises so that the liquid crystal is now used as an optical shutter.

Further, the image bearing member used in the image forming apparatus of the present invention comprises an electroconductive substrate and a photosensitive layer provided thereon. The photosensitive layer suitably comprises amorphous silicon doped with hydrogen. In another embodiment, it is suitable that the photosensitive layer comprises a laminate of a charge generation layer and a charge transportation layer which are functionally separated from each other. The charge generation layer may be formed by dispersing a charge generating material such as disazo pigments, phthalocyanine pigments such as copper phthalocyanine and aluminum phthalocyanine, aromatic polycyclic quinone, perylene pigments, indigo dyes, pyrylium dyes, and amorphous silicon doped with hydrogen into an appropriate binder and coating a substrate with the resultant dispersion or may be formed as a deposition layer of such a charge generating material by using a vapor deposition apparatus. The binder used in the formation of the charge generation layer by coating may preferably be selected from a wide scope of insulating resins including polyvinyl butyral, polyarylates such as a polycondensation product of bisphenol A and phthalic acid, polycarbonates, polyesters, phenoxy resins, polyvinyl acetate, acrylic resins, polyacrylamides, polyamides, polyvinylpyridine, cellulosic resins, polyurethane resins, epoxy resins, casein, polyvinyl alcohol, and polyvinylpyrrolidone. Alternatively, the binder resin may be selected from organic photoconductive polymers such as poly-N-vinylcarbazole, polyvinylanthracene and polyvinylpyrene.

The resin may preferably be contained in the charge generation layer in a proportion of not more than 80 wt. %, particularly not more than 40 wt. %.

The charge transportation layer is electrically connected to the above-mentioned charge generation layer and has functions of receiving charge carries injected from the charge generation layer and transporting the charge carriers to the surface. The charge transportation layer may be laminated on the charge generation layer or disposed therebelow. However, the charge transportation layer is preferably laminated on the charge generation layer.

A photoconductive material generally has a function of transporting charge carries and may be used as a charge transporting material in the charge transportation layer.

The charge transporting material includes an electron transporting material and a positive hole transporting material. The electron transporting material includes an electron attractive material such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone and 2,4,8-trinitrothioxanthone, and a material obtained by forming such an electron attractive material into a polymer.

The positive hole transporting material includes pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine; hydrazones such as p-diethylaminobenzaldehyde-N,N-diphenylhydrazone, p-diethylaminobenzaldehyde-N-α-naphthyl-N-phenylhydrazone, p-pyrrolidinobenzaldehyde-N,N-diphenylhydrazone, 1,3,3-trimethylindolenine-ω-aldehyde-N,N-diphenylhydrazone, and p-diethylbenzaldehyde-3-methylbenzthiazolinone-2-hydrazone; 2,5-bis(p-diethylaminophenyl)-1,3,4-oxadiazole, pyrazolines such as 1-phenyl-3-(p-diethylaminostyril)-5-(p-diethylaminophenyl)pyrazoline, 1-(quinolyl(2))-3-(p-diethylaminostyril)-5-(p-diethylaminophenyl)pyrazoline, 1-(pyridil(-2))-3-(p-diethylaminostyril)-5-(p-diethylaminophenyl)pyrazoline, 1-(6-methoxy-pyridil (2))-3-(p-diethylaminophenyl)pyrazoline, 1-(pyridil(3))-3-(p-diethylaminostyril)-5-(p-diethylaminophenyl)pyrazoline, 1-(lepidil(2))-3-(p-diethylaminostyril)-5-(p-diethylaminophenyl)pyrazoline, 1-(pyridil (2))-3-(p-diethylaminostyril)-4-methyl-5-(p-diethylaminophenyl)-pyrazoline, 1-(pyridil(2))-3-(α-methyl-p-diethylaminostyril)-5-(p-diethylaminophenyl)pyrazoline, 1-phenyl-3-(p-diethylaminostyril)-4-methyl-5-(p-diethylaminophenyl)pyrazoline, 1-phenyl-3-(α-benzyl-p-diethylaminostyril)-5-(p-diethylaminophenyl)pyrazoline, and spiropyrazoline; oxazole compounds such as 2-(p-diethylaminostyril)-6-diethylaminobenzoxazole, and 2-(p-diethylaminophenyl)-4-(p-dimethylaminophenyl)-5-(2-chlorophenyl)oxazole; thiazole compounds such as 2-(p-diethylaminostyril)-6-diethylaminobenzthiazole; triarylmethane compounds such as bis(4-diethylamino2-methylphenyl)phenylmethane; polyarylalkanes such as 1,1-bis(4-N,N-diethylamino-2-methylphenyl)heptane, and 1,1,2,2-tetrakis(4-N,N-dimethylamino-2-methylphenyl)ethane; triphenylamine, poly-N-vinylcarbazole, polyvinylpyrene, polyvinylanthracene, polyvinylacridine, poly-9-vinylphenylanthracene, pyrene-formaldehyde resin, and ethylcarbazole-formaldehyde resin.

When the transporting material does not have a film-forming property, it may be formed into a film by using an appropriate binder. Resins usable as the binder include insulating resins such as acrylic resins, polyallylates, polyesters, polycarbonates, polystyrene, acrylonitrile-styrene copolymer, acrylonitrile-butadiene copolymer, polyvinyl butyral, polyvinyl formal, polysulfones, polyacrylamide, polyamides and chloridized rubber, and organic photoconductive polymers such as poly-N-vinylcarbazole and polyvinyl anthracene.

The electroconductive substrate may be formed from an electroconductive material alone such as aluminum, aluminum alloy, copper, zinc, stainless steel, vanadium, molybdenum, chromium, titanium, nickel, indium, gold and platinum, or from a composite material such as a substrate of a plastic, e.g., polyethylene, polypropylene, polyvinyl chloride, polyethylene terephthalate, an acrylic resin and polyethylene fluoride coated with electroconductive particles such as carbon black and silver particles together with an appropriate binder, or a substrate of a plastic or paper impregnated with electroconductive particles, or from a plastic comprising an electroconductive polymer.

As is apparent from the foregoing explanation, the image forming apparatus of the present invention comprises liquid crystal shutters wherein a ferroelectric liquid crystal is used and has solved a problem of the conventional liquid crystal shutters that the response is slow. Thus, there is provided an effective step for commercial production of an image forming apparatus which has characteristics such as small size, a low cost and a high information or packaging density.

What is claimed is:

1. An electro-optical switching apparatus for forming an image comprising:
 (a) a light source for emitting light rays;
 (b) a light-path switching means comprising
   (i) a first base plate having scanning lines,
   (ii) a second base plate having data lines,
   (iii) a ferroelectric liquid crystal disposed between the first and second base plates,
   (iv) a driving means for driving the ferroelectric liquid crystal by selective application of signals to the scanning lines and the data lines so as to cause the ferroelectric liquid crystal to assume either one of light-transmitting state and light-interrupting state;
 (c) a temperature sensor for detecting the temperature of the ferroelectric liquid crystal and for generating an output response therefrom;

(d) a heating means for raising the temperature of the ferroelectric liquid crystal, said heating means comprising a resistance heater disposed on one of the base plates; and (e) a temperature-controlling means which, during the operation of said light-path switching means, receives said output from the temperature sensor for comparing the detected temperature with a predetermined operational temperature within a temperature range providing a ferroelectric liquid crystal phase, for restoring the temperature of the ferroelectric liquid crystal when the detected temperature is lower than the predetermined operational temperature by causing the heating means to raise the temperature of the ferroelectric liquid crystal until said detected temperature is above said predetermined temperature and thereafter cooling the ferroelectric liquid crystal to a temperature below said predetermined temperature, and for causing the heating means to maintain the temperature of the ferroelectric liquid crystal to be substantially constant.

2. An image forming apparatus according to claim 1 wherein said temperature control means comprises a cooling fan.

3. An electro-optical switching apparatus according to claim 1, which further comprises an image bearing member having an electroconductive substrate and a photoconductive layer on the electroconductive substrate.

4. An electro-optical switching apparatus according to claim 3 wherein said photosensitive layer comprises a film of amorphous silicon.

5. An electro-optical switching apparatus according to claim 3 wherein said photosensitive layer comprises a laminar structure comprising a charge generation layer and a charge transportation layer.

6. An electro-optical switching apparatus according to claim 1, wherein said ferroelectric liquid crystal is a chiral smectic liquid crystal.

7. An electro-optical switching apparatus according to claim 6, wherein said chiral smectic liquid crystal is produced from the smectic A phase in the course of temperature decrease.

8. An electro-optical switching apparatus according to claim 6, wherein said chiral smectic liquid crystal has a non-spiral structure.

9. An electro-optical switching apparatus according to claim 6, wherein said chiral smectic liquid crystal is a liquid crystal in a chiral smectic C or H phase.

10. An electro-optical switching apparatus for forming an image, comprising:
(a) a light for emitting light rays;
(b) a light-path switching means comprising
(i) a first base plate having scanning lines,
(ii) a second base plate having data lines,
(iii) a ferroelectric liquid crystal disposed between the first and second base plates, and
(iv) a driving means for driving the ferroelectric liquid crystal by selective application of signals to the scanning lines and the data lines so as to cause the ferroelectric liquid crystal to assume either one of light-transmitting state and light-interrupting state;
(c) a temperature sensor for detecting the temperature of the ferroelectric liquid crystal and for generating an output response therefrom;

(d) a heating means for raising the temperature of the ferroelectric liquid crystal, said heating means comprising a resistance heater disposed on the base plate; and (e) a temperature controlling means which, during the operation of said light-path switching means, receives said output from the temperature sensor for comparing said detected temperature with a predetermined operational temperature within a temperature range providing a ferroelectric liquid crystal phase, for restoring the temperature of the ferroelectric liquid crystal when the detected temperature is lower than the predetermined operational temperature by causing the heating means to raise the temperature of the ferroelectric liquid crystal until said detected temperature is above said predetermined temperature and thereafter cooling the ferroelectric liquid crystal to a temperature below said predetermined temperature and then heating the ferroelectric liquid crystal to a temperature above said predetermined temperature, and for causing the heating means to maintain the temperature of the ferroelectric liquid crystal to be substantially constant.

11. An electro-optical switching apparatus according to claim 10 wherein said light-path switching means comprises coordinate designating means.

12. An electro-optical switching apparatus according to claim 10 which further comprises an image bearing member having an electroconductive substrate and a photoconductive layer on the electroconductive substrate.

13. An electro-optical switching apparatus according to claim 12 wherein said photosensitive layer comprises an amorphous silicon film.

14. An electro-optical switching apparatus according to claim 12 wherein said photosensitive layer comprises a laminar structure comprising a charge generation layer and a charge transportation layer.

15. An electro-optical switching apparatus according to claim 10, wherein said ferroelectric liquid crystal is a chiral smectic liquid crystal.

16. A electro-optical switching apparatus according to claim 15 wherein said chiral smectic liquid crystal is produced from the smectic A phase in the course of temperature decrease.

17. A electro-optical switching apparatus according to claim 15 wherein said chiral smectic liquid crystal has a non-spiral structure.

18. A electro-optical switching apparatus according to claim 15 wherein said chiral smectic liquid crystal is a liquid crystal in a chiral smectic C or H phase.

19. A liquid crystal apparatus, comprising:
(a) a liquid crystal panel comprising a pair of electrode plates and a ferroelectric liquid crystal disposed between the electrode plates, the ferroelectric liquid crystal having a chiral smectic C temperature range in which the ferroelectric liquid crystal assumes chiral smectic C phase,
(b) a temperature sensor for detecting the temperature of the ferroelectric liquid crystal,
(c) a heating means for heating the ferroelectric liquid crystal, and
(d) a temperature control means for controlling the temperature of the ferroelectric liquid crystal capable of effecting
a first step of heating the ferroelectric liquid crystal to a prescribed temperature above the chiral smectic C temperature range by the heating means and then lowering the temperature of the ferroelectric liquid crystal, and a second step of heating the ferroelectric liquid crystal by the heating means when the temperature sensor detects a temperature below a prescribed temperature within the chiral smectic C temperature range and lowering the temperature of the ferroelectric liquid crystal when the temperature sensor detects a temperature above the prescribed temperature within the chiral smectic C temperature range.

20. A liquid crystal apparatus, comprising:
(a) a liquid crystal panel comprising a pair of electrode plates and a ferroelectric liquid crystal disposed between the electrode plates, the ferroelectric liquid crystal having a chiral smectic C temperature range in which the ferroelectric liquid crystal assumes chiral smectic C phase,
(b) a temperature sensor for detecting the temperature of the ferroelectric liquid crystal,
(c) a heating means for heating the ferroelectric liquid crystal, and
(d) a temperature control means for controlling the temperature of the ferroelectric liquid crystal capable of effecting a first step of heating the ferroelectric liquid crystal and lowering the temperature of the ferroelectric liquid crystal when the temperature sensor detects a temperature above a prescribed temperature above the chiral smectic C temperature range, and a second step of heating the ferroelectric liquid crystal by the heating means when the temperature sensor detects a temperature below a prescribed temperature within the chiral smectic C temperature range and lowering the temperature of the ferroelectric liquid crystal when the temperature sensor detects a temperature above the prescribed temperature within the chiral smectic C temperature range.

* * * * *

UNITED STATES PATENT AND TRADEMARK OFFICE
CERTIFICATE OF CORRECTION

PATENT NO. : 4,907,859
DATED : March 13, 1990
INVENTOR(S) : YOSHIHIRO TAKADA ET AL.

It is certified that error appears in the above-identified patent and that said Letters Patent is hereby corrected as shown below:

COLUMN 10

Line 17, "lnes" should read --lines--.

COLUMN 13

Line 31, "carries" should read --carriers--.

COLUMN 15

Line 23, "image forming apparatus" should read --electro-optical switching apparatus--.

COLUMN 16

Line 43, "A" should read --An--.
Line 47, "A" should read --An--.
Line 50, "A" should read --An--.

Signed and Sealed this

Twenty-seventh Day of August, 1991

Attest:

HARRY F. MANBECK, JR.

Attesting Officer

Commissioner of Patents and Trademarks